US009031001B2

(12) United States Patent
Yang et al.

(10) Patent No.: US 9,031,001 B2
(45) Date of Patent: May 12, 2015

(54) METHOD AND APPARATUS FOR ACCURATE TIME SYNCHRONIZATION IN WIRELESS COMMUNICATION SYSTEM (71) Applicant: Murata Manufacturing Co., Ltd., Nagaokakyo-shi, Kyoto-fu (JP)

(72) Inventors: Dong Yang, Shanghai (CN); Yujie Zhu, Shanghai (CN); Yanbing Yu, Shanghai (CN)

(73) Assignee: Murata Manufacturing Co., Ltd., Kyoto (JP)

( * ) Notice: Subject to any disclaimer, the term of this patent is extended or adjusted under 35 U.S.C. 154(b) by 151 days.

(21) Appl. No.: 13/629,650

(22) Filed: Sep. 28, 2012

(65) Prior Publication Data
US 2013/0021976 A1 Jan. 24, 2013

Related U.S. Application Data (63) Continuation of application No. PCT/CN2010/071380, filed on Mar. 29, 2010.

(51) Int. Cl.
*H04L 27/26* (2006.01)
*H04L 5/00* (2006.01)

(52) U.S. Cl.
CPC .......... *H04L 27/2663* (2013.01); *H04L 5/0048* (2013.01); *H04L 27/2671* (2013.01)

(58) Field of Classification Search
USPC ................... 370/203, 328, 329, 350
See application file for complete search history.

(56) References Cited

U.S. PATENT DOCUMENTS

| 6,658,063 | B1 | 12/2003 | Mizoguchi et al. | |
| 8,139,699 | B2* | 3/2012 | Vaidyanathan et al. | 375/368 |
| 2004/0223554 | A1 | 11/2004 | Cha | |
| 2006/0114812 | A1 | 6/2006 | Kim et al. | |
| 2006/0154624 | A1 | 7/2006 | Suzuki | |
| 2006/0203925 | A1* | 9/2006 | Pirooz et al. | 375/260 |
| 2007/0002937 | A1 | 1/2007 | Min et al. | |
| 2007/0211832 | A1 | 9/2007 | Lee et al. | |
| 2008/0043886 | A1* | 2/2008 | Inagawa et al. | 375/343 |

(Continued)

FOREIGN PATENT DOCUMENTS

| CN | 101437005 A | 5/2009 |
| CN | 101536385 A | 9/2009 |

(Continued)

OTHER PUBLICATIONS

English translation of Official Communication issued in corresponding Japanese Patent Application No. 2012-556361, mailed on Oct. 15, 2013.

(Continued)

*Primary Examiner* — Curtis A Alia
(74) *Attorney, Agent, or Firm* — Keating & Bennett, LLP (57) ABSTRACT A method and apparatus for time synchronization and an OFDMA receiver thereof are provided. A preamble timing is obtained by a two-stage correlation in a time domain between a sequence of a received symbol and a reference preamble. The two-stage correlation is further simplified to perform a conjugate multiplication between a one-stage correlation and its correspondingly delayed result. A preamble boundary is adaptively determined by a peak value based on a result of the two-stage correlation. In this way, the time synchronization is achieved with a robust performance in a low SNR, high frequency offset or large delay spread fading channel.

19 Claims, 11 Drawing Sheets

(56) References Cited

U.S. PATENT DOCUMENTS

| | | |
|---|---|---|
| 2009/0154627 A1 | 6/2009 | Park et al. |
| 2009/0180559 A1 | 7/2009 | Hsu et al. |
| 2010/0020674 A1 | 1/2010 | Choi et al. |

FOREIGN PATENT DOCUMENTS

| | | |
|---|---|---|
| JP | 2001-313684 A | 11/2001 |
| JP | 2003-110523 A | 4/2003 |
| JP | 3596442 B2 | 9/2004 |
| JP | 2004-282764 A | 10/2004 |
| TW | 200926703 A | 6/2009 |

OTHER PUBLICATIONS

Official Communication issued in International Patent Application No. PCT/CN2010/071380, mailed on Jan. 6, 2011.

Official Communication issued in corresponding Chinese Patent Application No. 201080065763.4, mailed on May 29, 2014.

* cited by examiner

FIG.10 ns of the signal. The typical algorithm is CP
METHOD AND APPARATUS FOR ACCURATE TIME SYNCHRONIZATION IN WIRELESS COMMUNICATION SYSTEM

BACKGROUND OF THE INVENTION

1. Field of the Invention

The present invention relates to Orthogonal Frequency Division Multiple Access (OFDMA) wireless communication, and more specifically, to a time synchronization method for Worldwide Interoperability for Microwave Access (WiMAX) system.

2. Description of the Related Art

Orthogonal Frequency Division Multiplexing (OFDM) is a promising technology that is widely used in wireless communication systems, and converts a frequency selective channel to a collection of frequency-flat subchannels achieved by splitting the input high-rate data stream into a number of low-rate substreams. In order to enhance the efficiency of the frequency allocation, the technique of Orthogonal Frequency Division Multiple Access (OFDMA) is proposed to allow multiple users to access a same channel, by dividing available subcarriers into mutually exclusive clusters assigned to distinct users for simultaneous transmission. The orthogonality of the subcarriers guarantees intrinsic protection against multiple access interference, while the adoption of a dynamic subcarrier assignment strategy provides the system with high flexibility in resource management. OFDMA has become a part of IEEE 802.16 standards for wireless metropolitan area networks as a promising candidate for next generation broadband wireless networks.

With more fine frequency allocation, OFDMA signal demodulation is extremely sensitive to timing errors and carrier frequency offsets. Inaccurate compensation of the frequency offset destroys the orthogonality among subcarriers and produces inter-carrier interference (ICI). Timing errors result in inter-symbol interference (ISI) and produce severe error rate degradations.

OFDMA uses a cyclic extension between adjacent symbols to provide intrinsic protection against the time dispersion and timing offset. In the WiMAX standard, IEEE 802.16e, the cyclic prefix (CP) is adopted. As soon as the symbol timing is detected within the cyclic extension, the received spectrum will keep the constant magnitude and only lead to a phase rotation. But if the symbol timing is detected out of the cyclic extension, both the magnitude and the phase of the current symbol are interfered with by the adjacent symbols, which leads to unrecoverable errors in a received frequency spectrum.

In an OFDMA downlink process, the OFDMA symbols are generated after an Inverse Fast Fourier Transform (IFFT) and converted from the tones in frequency domain to the signal in time domain in a base station (BS), while in a mobile station (MS) or subscriber station (SS) the symbols should be detected and converted to the tones in the frequency domain after a FFT unit. The preamble is the first symbol modulated with the predetermined pseudo random sequence and highest power in a time division duplex (TDD) frame. Hence, it is a good signal for detecting the start position of an OFDMA frame and the frequency offset over the channel.

Existing techniques based on preamble detection as time synchronization have some drawbacks.

A popular scheme of preamble detection uses a delay-correlation mechanism, which utilizes the repetitive property of the signal in a time domain. The typical algorithm is CP auto-correlation or M-correlation based on the modulo-3 periodic property in the WiMAX preamble, where M is a number equal to one third of the FFT length. But these correlation results may have a plateau, which affects the position of the symbol boundary and also leads to inaccurate estimation of the fractional frequency offset at that location. In another words, it could lead to an ICI error. Moreover, the M-correlation works badly in multi-cell deployment of a WiMAX system because of the repetition degradation in the preamble. Therefore, the delay-correlation only offers coarse time synchronization under the low signal to noise ratio (SNR) or the time-variant fading channels.

Another technique based on preamble cross-correlation in time domain can offer fine time synchronization, while it is quite sensitive to the carrier frequency offset and should better be processed after the frequency offset compensation. Moreover, this method will produce multi-peaks in the WiMAX preamble because of a modulo-3 property, which makes the peak detection difficult.

Besides the above techniques, the conjugate symmetric property of a BPSK modulated preamble can also be used to perform symbol timing. This method produces several sharp peaks with the biggest peak located at the preamble boundary, but its implementation requires a lot of complex multipliers and delay taps which causes a heavy burden on the system.

SUMMARY OF THE INVENTION

Preferred embodiments of the present invention provide a method and apparatus for accurate time synchronization and a receiver thereof. The method, apparatus and receiver are applicable in a WiMAX communication system or a Long Term Evolution (LTE) program. Based on the characteristics of time-domain correlation and the periodic property of symbol sequence, robust and highly accurate preamble synchronization is obtained by performing a simplified two-stage correlation based on a symbol sequence and a reference preamble. The preamble boundary is determined based on an obvious target peak which is detected by an adaptive peak detector. Advantageously, preferred embodiments of the present invention allow for an easy detection of a start position of an OFDMA frame and at the same time reduce the system complexity and offer a robust performance in the low SNR, high frequency offset or large delay spread fading channel.

In a preferred embodiment of the present invention, a method for time synchronization is provided. The method may preferably include the steps of receiving a sequence of symbols; performing a two-stage correlation in a time domain based on the sequence of symbols and a reference preamble; and detecting a preamble symbol from the result of the two-stage correlation.

In another preferred embodiment of the present invention, an apparatus for time synchronization is provided. The apparatus may preferably include a two-stage correlator configured to perform a two-stage correlation in a time domain based on a received sequence of symbols and a reference preamble; and a detector coupled to the two-stage correlator, wherein the detector is configured to detect a preamble symbol from the result of the two-stage correlation.

In yet another preferred embodiment of the present invention, an OFDMA receiver is provided. The receiver may preferably include an apparatus for time synchronization and an apparatus for frequency synchronization coupled to the apparatus for time synchronization, configured to estimate and compensate a carrier frequency offset of the received sequence of symbols. The apparatus for time synchronization may include a two-stage correlator configured to perform a two-stage correlation in a time domain based on a received sequence of symbols and a reference preamble; and a detector coupled to the two-stage correlator, wherein the detector is configured to detect a preamble symbol from the result of the two-stage correlation.

The above and other elements, features, steps, characteristics and advantages of the present invention will become more apparent from the following detailed description of the preferred embodiments with reference to the attached drawings.

BRIEF DESCRIPTION OF THE DRAWINGS

In the drawings, each identical or nearly identical component that is illustrated in various figures is represented by a like numeral. For purposes of clarity, not every component may be labeled in every drawing.

DETAILED DESCRIPTION OF THE PREFERRED EMBODIMENTS

The purposes, technical solutions and advantages of the preferred embodiments of the present invention will become more readily apparent by reference to the following description of the preferred embodiments, when taken in conjunction with the accompanying drawings.

Figure 1:
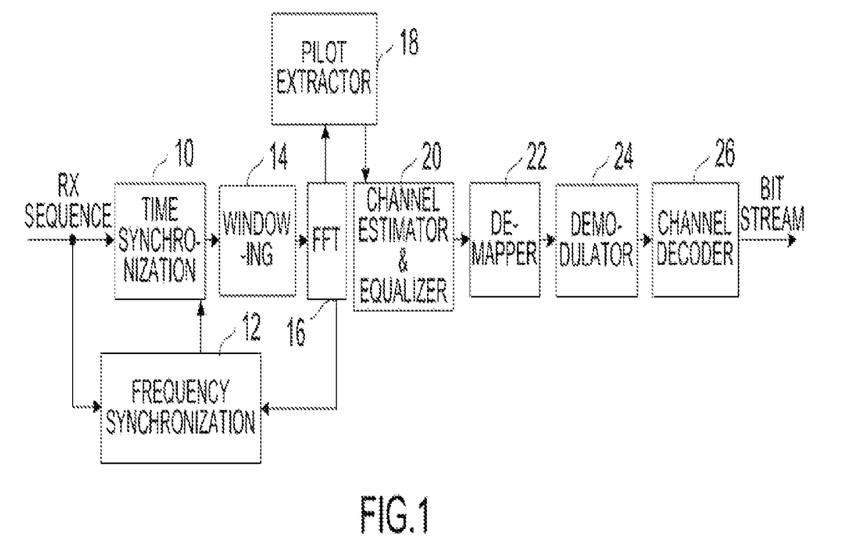
FIG. 1 is a block diagram of an OFDMA receiver.

FIG. 1 illustrates a block diagram of an OFDMA receiver. As shown in FIG. 1, the OFDMA receiver may preferably include a time synchronization module 10, a frequency synchronization module 12, a symbol windowing module 14, a Fast Fourier Transform (FFT) processor 16, a Pilot extractor 18, a channel estimator and equalizer 20, a demapper 22, a demodulator 24, and a channel decoder 26.

The time synchronization module is configured to estimate the timing offset and determines an OFDMA frame boundary. The frequency synchronization module 12 is configured to estimate and compensate the carrier frequency offset of the received signal. In particular, in the frequency synchronization module 12, a fractional carrier frequency offset may be estimated in a time domain and the integer carrier frequency offset may be estimated in a frequency domain. The symbol windowing module 14 is configured to determine the FFT window timing by removing the cyclic prefix of an OFDMA symbol. The FFT processor 16 is configured to convert a time-domain signal to a frequency-domain signal. The channel estimator 20 is configured to estimate the amplitude and phase shift caused by the wireless channel from the available pilot information, which is obtained by a pilot extractor 18. The channel equalizer 20 removes the effect of the wireless channel and allows subsequent symbols to be demapped and demodulated. The demapper 22 allows a subcarrier permutation and converts the subcarrier order from a physical subcarrier to a logical subcarrier. The demodulator 24 is configured to recover the OFDMA tone to the information bits based on the phase shifting keying (PSK) or quadrature amplitude modulation (QAM) scheme used in IEEE802.16e. At last, the information bit stream is decoded by a channel decoder 26 which often includes the mirror operations of randomization, forward error correction coding and interleaving.

Generally, time synchronization is the first step in the entire OFDMA synchronization process and the preamble is the first symbol in the OFDMA frame with the highest power and used to perform time synchronization.

Figure 2:
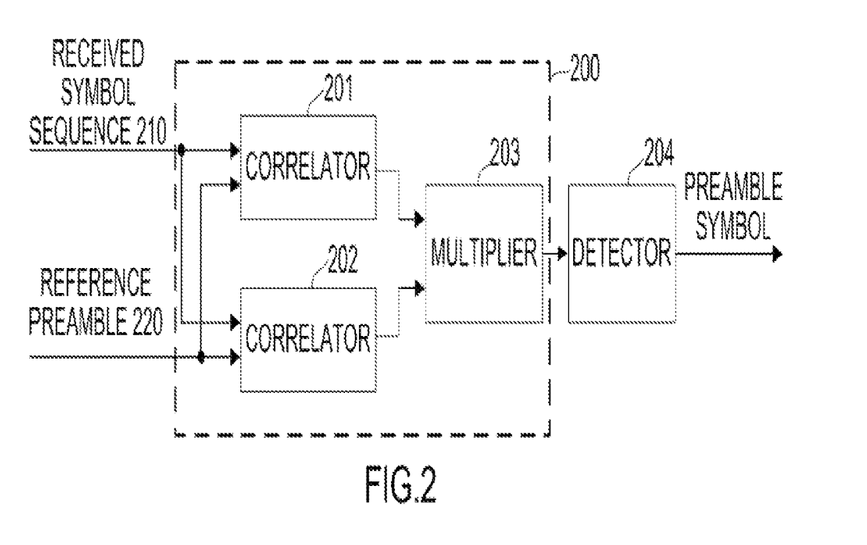
FIG. 2 is a diagram of an apparatus for time synchronization according to a preferred embodiment of the present invention.

FIG. 2 illustrates a diagram of a time synchronization apparatus for accurate time estimation according to a preferred embodiment of the present invention. As illustrated in FIG. 2, the time synchronization apparatus may include a two-stage correlator 200 and a detector 204 (also referred to as a peak detector) coupled to the two-stage correlator 200. The two-stage correlator 200 may include a first correlator 201, a second correlator 202 and a multiplier 203, for example.

The correlators 201 and 202 are two one-stage correlators to realize cross correlation between a received sequence of symbols 210 (e.g., OFDMA symbol sequence) and a reference preamble 220, which may be represented in equation (1) and (2).

$$R_1(m) = \sum_{k=0}^{L-1} x(m+k) \cdot c^*(k) \quad (1)$$

$$R_2(m) = \sum_{k=0}^{L-1} x(m+N-M+k) \cdot c^*(N-M+k) \quad (2)$$

In equation (1) and (2), x is a complex sequence 210 of the received OFDMA symbols generated by an analog to digital converters (ADC) in a receiver, c is a sequence 220 for reference preamble symbol, (.)* denotes a complex conjugate operator, m is the sampling index, L is the correlation length, N is FFT size and M is a predetermined time period equal to one third of N in mobile WiMAX. $R_1$ refers to the first one-stage correlator 201 and $R_2$ refers to the second one-stage correlator 202. Their correlation results are recorded as $\overline{R}_1$ and $\overline{R}_2$, which are the absolute value of $R_1$ and $R_2$.

In the WiMAX specification, there are 114 pseudo-noise (PN) sequences used for different base station and sectors, which are often stored in a memory of a mobile station. Before synchronizing with a base station, the mobile station may read a reference preamble from the memory based on a known preamble index which is obtained by a conventional cell search process in a cellular system.

The preamble defined in IEEE802.16e includes three types of carrier-sets with different allocation of subcarriers, which may be modulated using a boosted BPSK with a specific pseudo-noise code. Because the tones of preamble align every three subcarriers, it shows a property of three pseudo periodic signals in a time domain with the length of M, where M is equal to floor (N/3).

Accordingly, the correlation result $\overline{R}_1$ equation (1) will possibly produce three obvious sharp peaks, which are located at 0, ⅓ and ⅔ of the symbol length of the preamble.

To suppress the useless peaks, the two-stage correlator 200 may further include a multiplier 203. The multiplier 203 multiplies $R_1$ with the result of conjugate operation of $R_2$ to emphasize the target peak. The final result of the multiplier 203 is denoted in equation (3).

$$R(m) = R_1(m) \cdot R^*_2(m) \quad (3)$$

Advantageously, instead of three obvious sharp peaks generated according to conventional methods and systems, only one obvious sharp peak is produced in the above-described preferred embodiment, thereby facilitating the peak detection process. This obvious sharp peak may then be used to determine the accurate symbol timing, where the peak value is the maximum value of $\overline{R}$ denoted as $\overline{R}_{max}$.

Moreover, the conjugate multiplier between two repetitive parts of the preamble used in equation (3) can increase the resistance on a common phase rotation in time domain, which usually results from the carrier frequency offset.

Since the reference preamble exhibits the property of M periodicity, the $R_2(m)$ in equation (2) is equivalent to $R_1(m)$ time shifted by N−M taps, which is shown in equation (4).

$$R_2(m) \approx \sum_{k=0}^{L-1} x(m+N-M+k) \cdot c^*(k) = R_1(m-N+M) \quad (4)$$

Consequently, R(m) in the equation (3) can be rewritten as shown in equation (5), and the $\overline{R}(m)$ is given in the equation (6).

$$R(m) = R_1(m) \cdot R^*_1(m-N+M) \quad (5)$$

$$\overline{R}(m) = |R_1(m) \cdot R^*_1(m-N+M)| = |R^*_1(m) \cdot R_1(m-N+M)| \quad (6)$$

In equation (5), as can be seen, two correlation operations are simplified to one correlation operation, one delay operation and one conjugate multiplication, where the hardware complexity is nearly reduced by half.

The corresponding reference power in equation (6) can be represented in the equation (7), and it is calculated once the cell is specified.

$$P = \sum_{k=0}^{L-1} |c(k)|^2 \cdot \sum_{k=0}^{L-1} |c(N-M+k)|^2 \quad (7)$$

Figure 3:
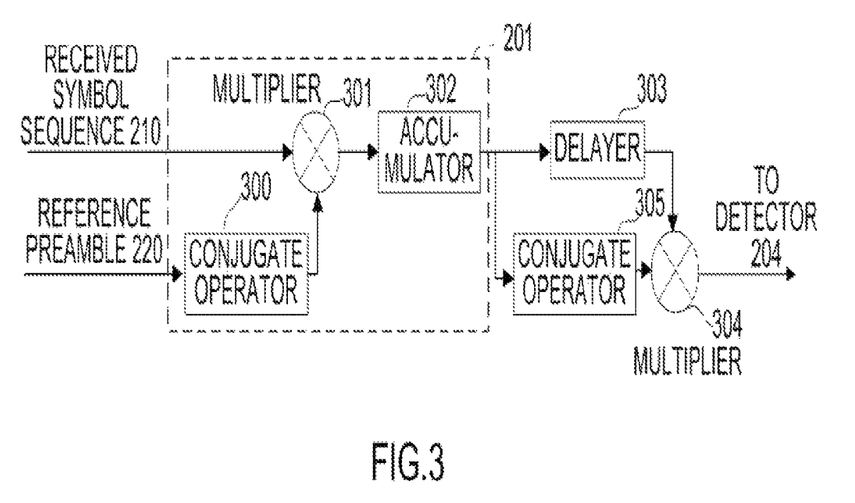
FIG. 3 is a diagram of a two-stage correlator according to a preferred embodiment of the present invention.

FIG. 3 illustrates a diagram of a simplified two-stage correlator according to a preferred embodiment of the present invention. The first correlator 201 includes one complex conjugate operator 300, L complex multipliers 301 and an accumulator 302. The second correlator 202 is implemented with a delayer 303 having (N−M) taps which delays the output of the first correlator 201 by N−M. In a preferred embodiment of the present invention, the delayer 303 preferably is implemented with a First In First Out memory (FIFO), for example. Advantageously, with this simplified structure, the number of complex multipliers may be reduced from 2*L+1 to L+1.

Figure 4:
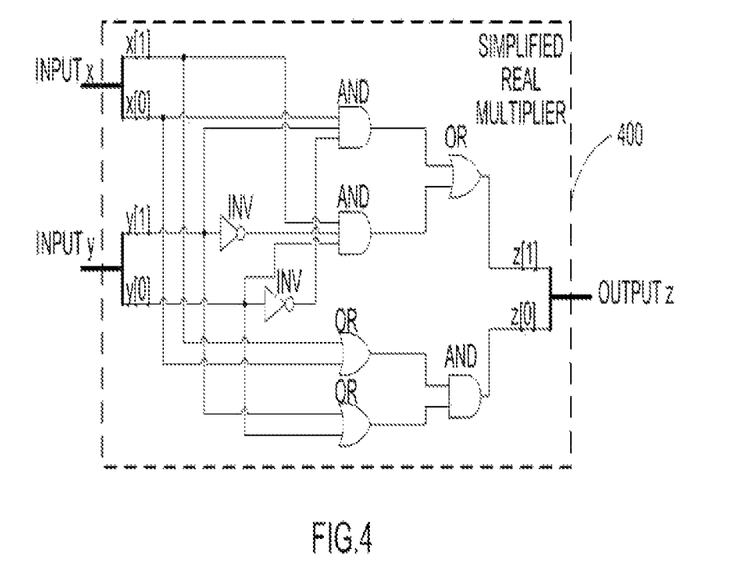
FIG. 4 is a diagram of a simplified real multiplier according to a preferred embodiment of the present invention.

In the correlator 201, most of the operations are multiplications, where the number of complex multipliers is L. It is understood that one complex multiplier preferably includes four real multipliers and two adders. Minimizing the data width of multipliers can reduce the operations of multipliers greatly. In various preferred embodiments of the present invention, only the most two significant bits of the received sequence take part in the correlation operations, whose correlation performance degrades slightly if L is not too small. The first bit is a sign bit, and the second bit is used to distinguish between 0 and 1. By this method, the reference power in equation (7) is equal to $4L^2$. Furthermore, an equivalent combinational logic may be used to replace the function of the real multiplier, which is shown in FIG. 4. Advantageously, this simplified real multiplier 400 is easy to be implemented in the Programmable Logic Devices (PLD) or Application Specific Integrated Circuits (ASIC).

Figure 5:
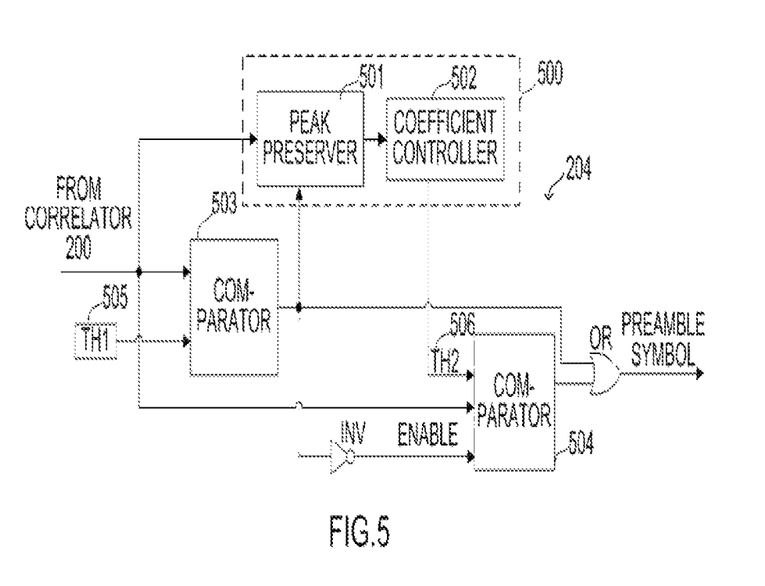
FIG. 5 is a diagram of a peak detector according to a preferred embodiment of the present invention.

FIG. 5 is a diagram of an adaptive detector 204 according to a preferred embodiment of the present invention. The detector 204 preferably includes a first comparator 503 and a second comparator 504, and a dynamic threshold generator 500. The first comparator 503 compares the present maximum correlation value $\overline{R}_{max}$ with a preset threshold TH1 505. It is noted that TH1 505 is a fixed value chosen to meet with the normal requirement under different SNR or channel quality, based on the reference power P. In a preferred embodiment of the present invention, the ratio of TH1 versus the reference power may preferably be 0.5, for example. In a normal situation, if the present maximum correlation value $\overline{R}_{max}$ is greater than a preset threshold TH1 505, the position of the peak value can be located immediately. The second comparator 504 is not enabled in this case. However, if the channel condition is very poor, the correlation degree may be degraded resulting from the uncertain interferences and the peak cannot be detected by the threshold TH1. In this case, the dynamic threshold generator 500 is in charge of the detection of weak peak. The dynamic threshold generator 500 includes a peak preserver 501 and a coefficient controller 502. The peak preserver 501 is configured to preserve the present peak value detected by the comparator 503. The coefficient controller 502 is used to generate a new threshold named TH2 506 by multiplying the previous peak value with a certain coefficient, preferably using 0.5, for example. The first comparator 503 has the priority to determine the running of the second comparator 504. The second comparator 504 is triggered only when the correlation degree becomes very low. The second comparator 504 then compares the present maximum correlation value $\overline{R}_{max}$ with TH2. In this way, the peak can be effectively detected regardless of whether the signal channel is in a good condition or in a poor condition.

Figure 6:
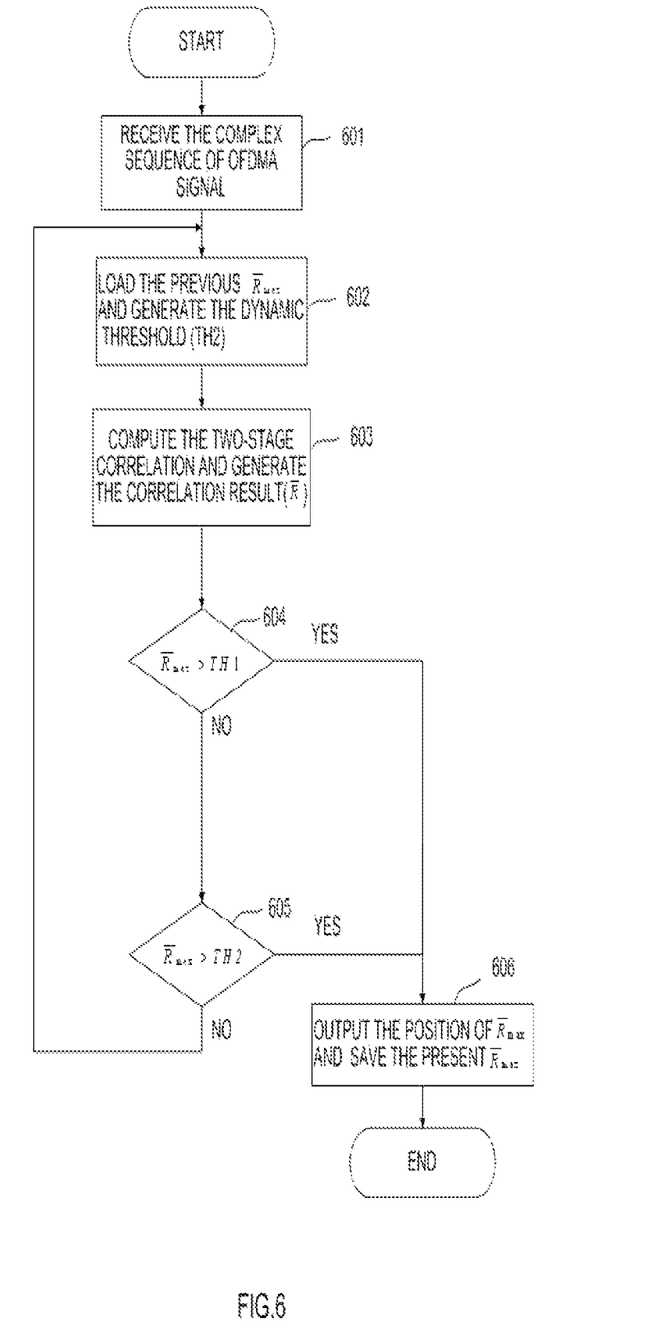
FIG. 6 is a flowchart of a method for time synchronization and peak detection according to a preferred embodiment of the present invention.

FIG. 6 is a flowchart of a method for time synchronization and peak detection according to a preferred embodiment of the invention. Upon Start, the complex sequence of OFDMA symbols which are converted by the ADCs is obtained at step 601. Next, at step 602, a previous peak value which denotes a maximum correlation value in a previous frame is loaded, and the dynamic threshold TH2 506 used in a present frame is then generated. Note that at the startup the previous peak value may not exist and the TH2 should be initialized with a preset threshold. At step 603, a two-stage correlation for the present frame is computed, and the correlation result $\overline{R}$ is then sent into the comparators. At step 604, the maximum value of $\overline{R}$ is compared with TH1. If the maximum value ($\overline{R}_{max}$) is greater than the preset threshold TH1, the process proceeds to step 606 where the position of this peak is output directly and the peak value is stored in memory which is used for the detection of next frame. Otherwise, the process proceeds to step 605 where $\overline{R}_{max}$ is compared with TH2. The synchronization process is terminated when $\overline{R}_{max}$ detected and its position has been output.

In a preferred embodiment of the present invention, the two-stage correlation at step 603 includes correlating the received sequence of symbols with the reference preamble and thereby obtaining the result of one-stage correlation; delaying the result of one-stage correlation; performing a conjugate operation on the result of the one-stage correlation; and multiplying the delayed result and the conjugate result and thus obtaining the result of the two-stage correlation.

Figure 7A:
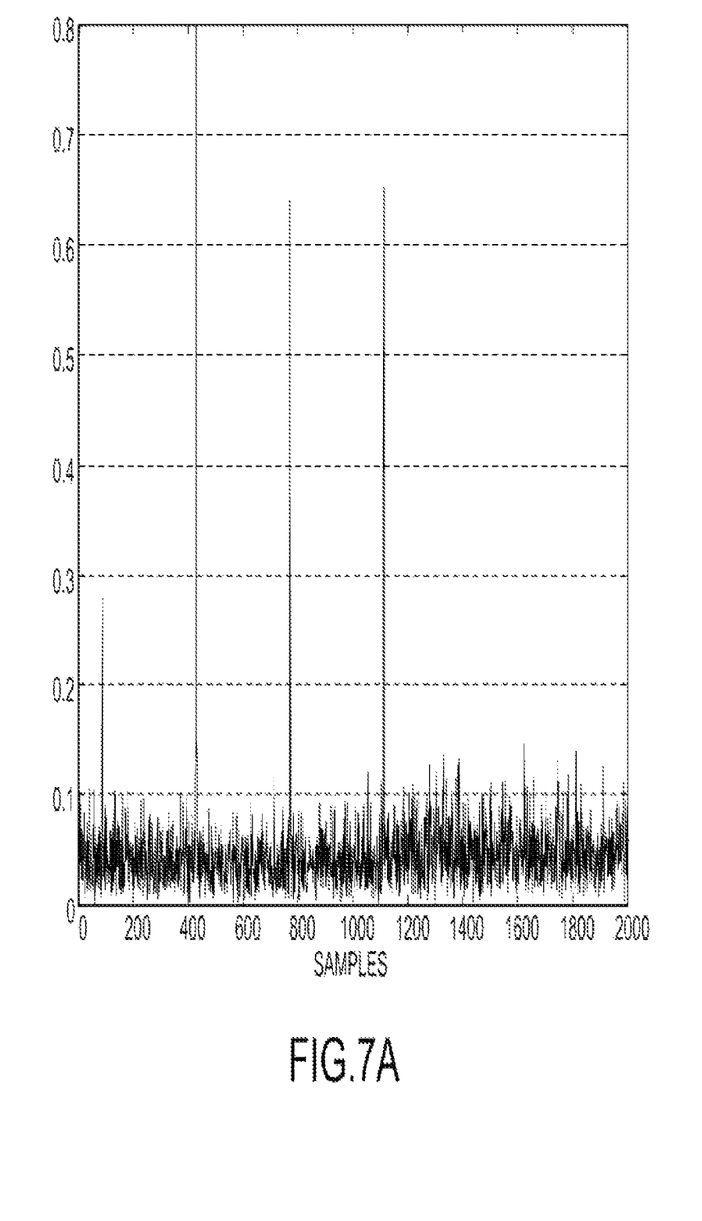
FIG. 7A is a plot of a simulated result in a normal channel for the output of the first correlator 201 shown in FIG. 2.
Figure 7B:
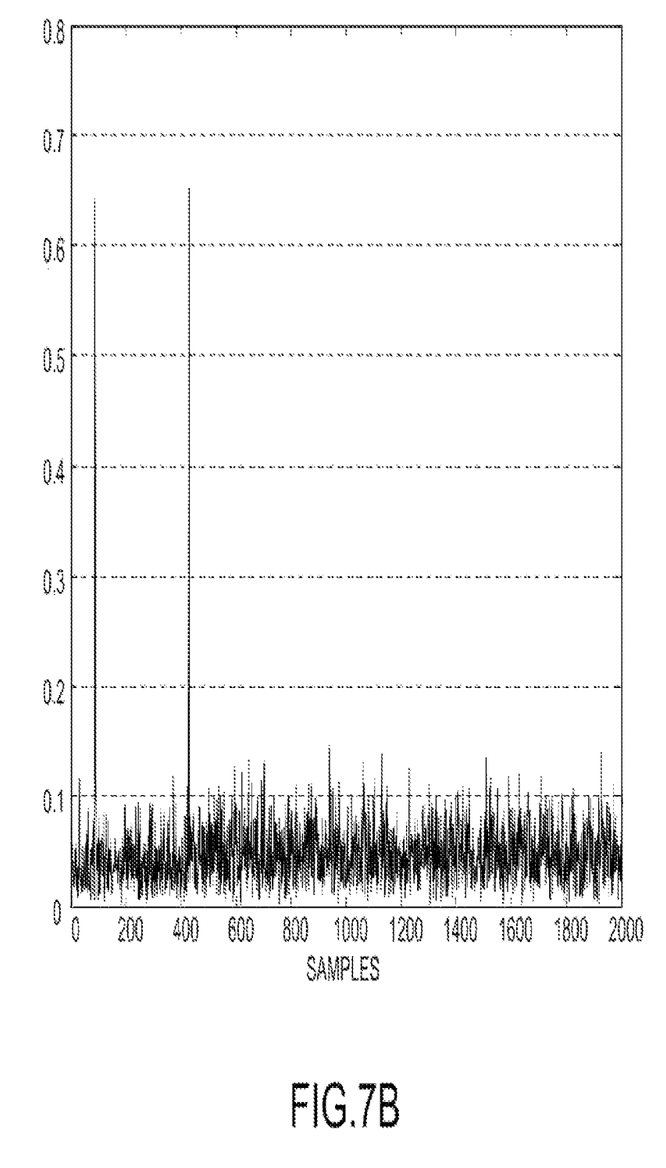
FIG. 7B is a plot of a simulated result in a normal channel for the output of the second correlator 202 shown in FIG. 2.
Figure 7C:
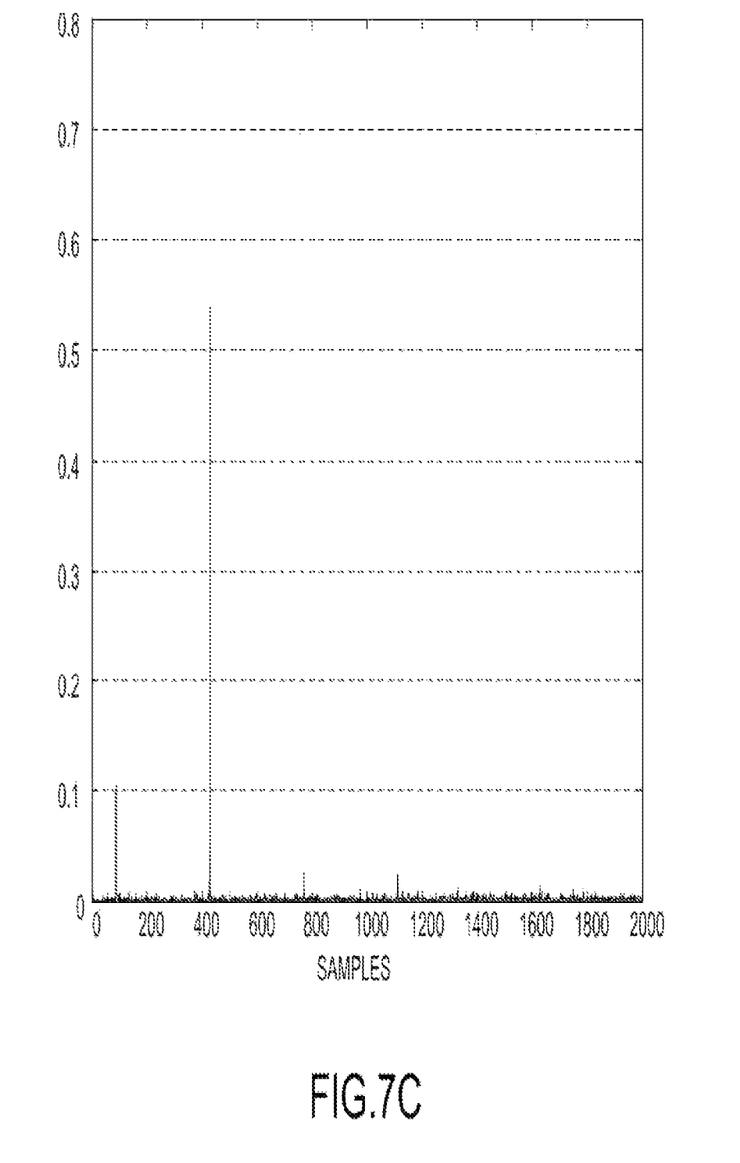
FIG. 7C is a plot of a simulated final result in a normal channel for output of the two-stage correlator shown in FIG. 2.

FIG. 7A, FIG. 7B and FIG. 7C are plots of simulated results in a normal channel for the output of the first correlator 201, the second correlator 202 and the two-stage correlator 200, respectively, according to a preferred embodiment of the present invention. In a preferred embodiment of the present invention, the simulation is preferably performed in an additive white Gaussian noise (AWGN) channel where SNR is 6 dB and the frequency offset is zero, for example. As can be seen, the result of one-stage correlation as shown in FIG. 7A and FIG. 7B has several peaks, while the two-stage correlation shown in FIG. 7C generates only one obvious sharp peak and the peak detector uses the threshold TH1 to handle the comparison.

According to the foregoing preferred embodiments of the present invention, the full width at half maximum (FWHM) of the peak is narrowed within a sampling spacing. Therefore, the methods of threshold comparison or maximum value search can achieve the same accuracy within one sampling point.

Figure 8A:
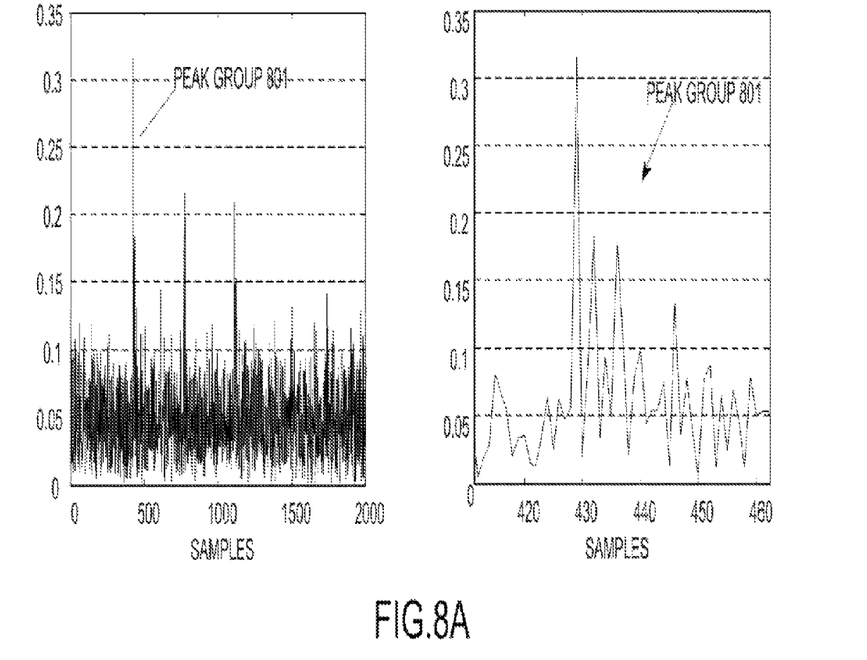
FIG. 8A is a plot of a simulated result in a poor delay spread channel for the output of the first correlator 201 shown in FIG. 2.
Figure 8B:
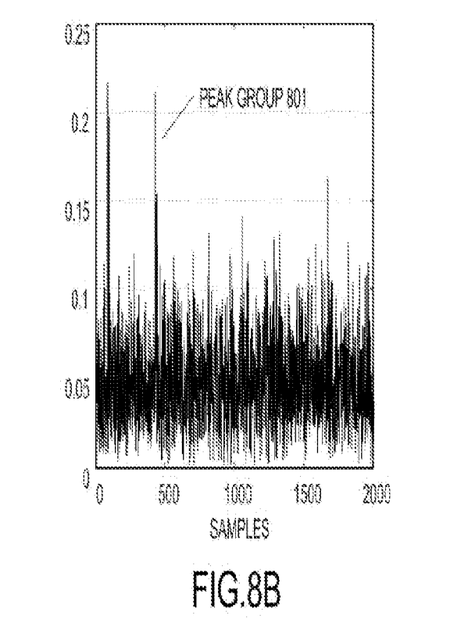
FIG. 8B is a plot of a simulated result in a poor delay spread channel for the output of the second correlator 202 shown in FIG. 2.
Figure 8C:
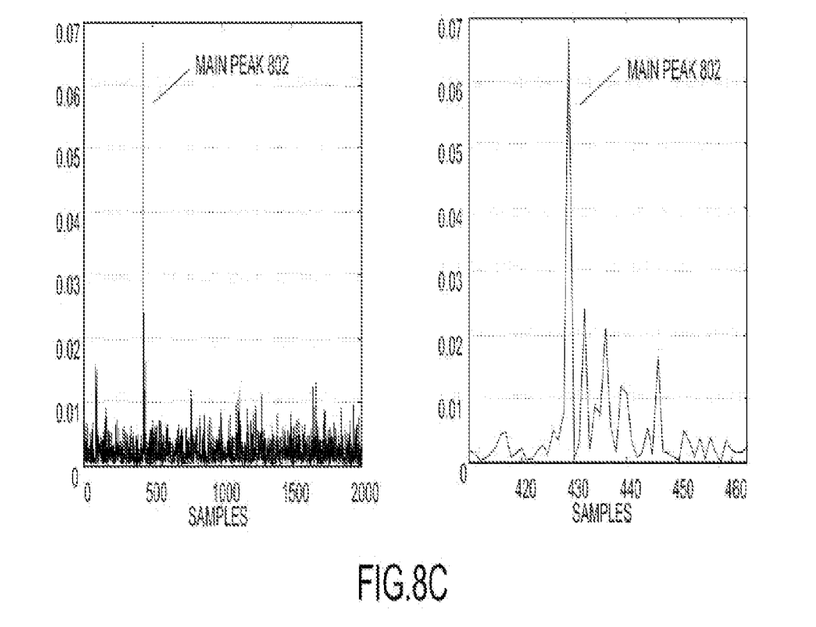
FIG. 8C is a plot of a simulated final result in a poor delay spread channel for the output of the two-stage correlator shown in FIG. 2.

FIG. 8A, FIG. 8B and FIG. 8C are plots of simulated results in a poor delay spread fading channel for the first correlator 201, the second correlator 202 and the two-stage correlator 200 respectively according to a preferred embodiment of the present invention. In a preferred embodiment of the present invention, the simulation is preferably performed in the International Telecommunication Union (ITU) Vehicular-A channel where SNR is −6 dB and the mobile speed is 120 kilometers per hour, for example. In this case, the result of one-stage correlation shown in FIG. 8A, FIG. 8B has several peak groups 801, where peak group 801 includes the peaks of multi-paths. The main peak 802 is not so outstanding comparing with the noise and other path peak. But in FIG. 8C, the main peak 802 is distinct and the peaks of other paths are suppressed, where the peak detector uses the threshold TH2 to handle the comparison.

Figure 9:
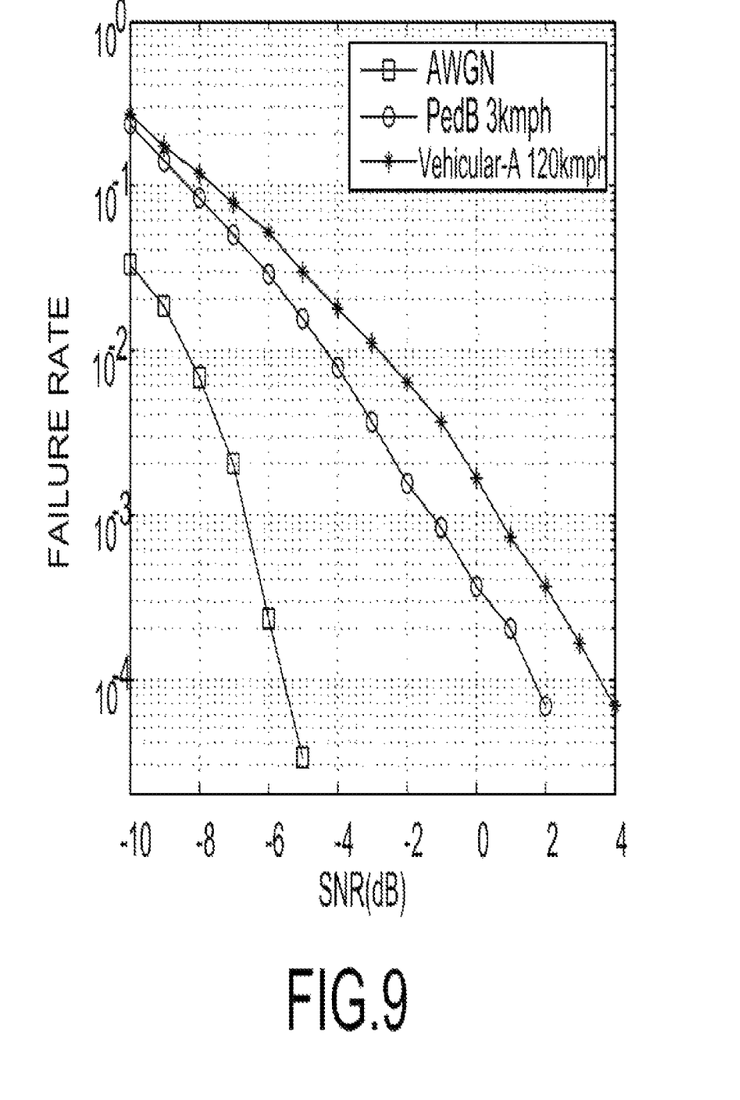
FIG. 9 is a plot of the time synchronization failure rate in different channels.

FIG. 9 is a plot of time synchronization failure rate according to different SNR and channels. The curves in FIG. 9 are preferably simulated in an additive white Gaussian noise (AWGN) channel, ITU Pedestrian B channel with speed of 3 kmph and ITU Vehicular-A channel with speed of 120 kmph individually. It is seen that preferred embodiments of the present invention offer the robust time detection under low SNR and high mobility conditions in time-variant fading channels.

Figure 10:
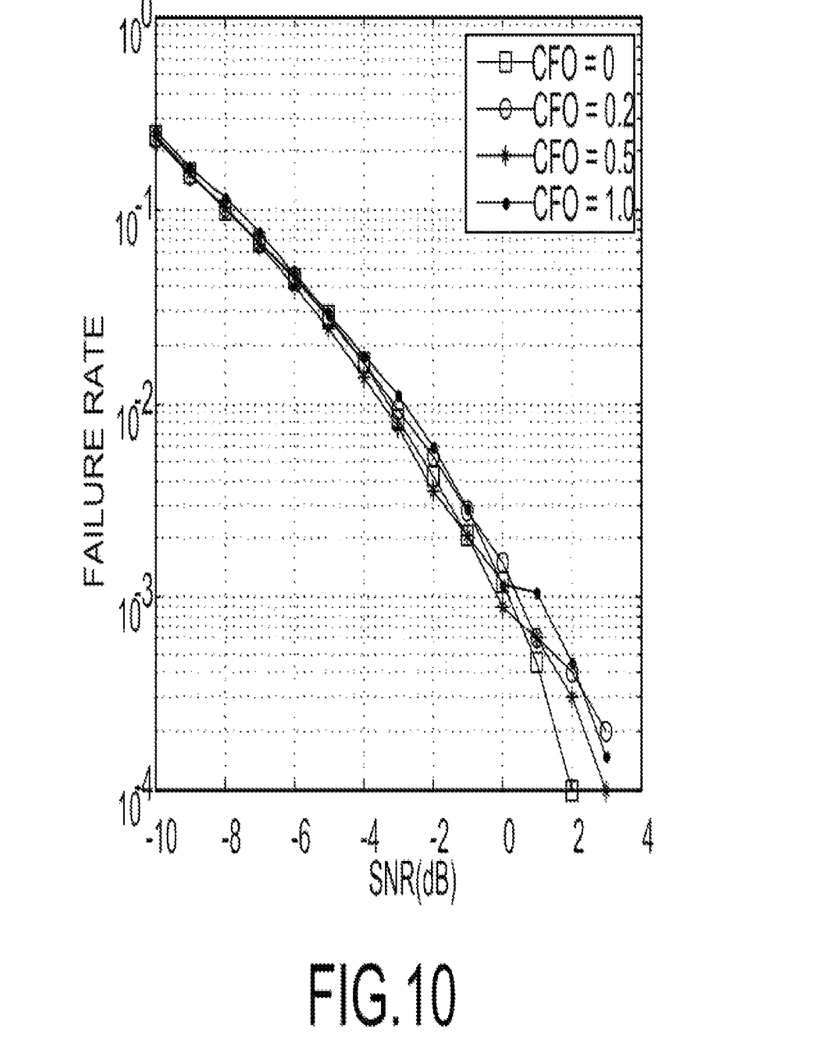
FIG. 10 is a plot of the time synchronization failure rate according to different frequency offset.

FIG. 10 is a plot of time synchronization failure rate according to the different frequency offsets. The curves in FIG. 10 are simulated in ITU Vehicular-A channel with speed of 120 kmph when an initial frequency offset is 0, 0.2, 0.5 and 1.0 subcarrier frequency spacing. The result exhibits the advantageous and significantly improved performance achieved by preferred embodiments of the present invention even if the frequency offset is not compensated completely, i.e., the two-stage correlation is insensitive to the phase rotation in time domain.

All or part of the preferred embodiments of the present invention may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein.

Although various preferred embodiments of the present invention have been described in language specific to structural features and/or method steps thereof, it is to be understood that the present invention defined in the appended claims is not necessarily limited to the specific features or steps described above. Rather, the specific features and steps are disclosed as exemplary forms of implementing the claimed invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for performing time synchronization, comprising:
    receiving a sequence of symbols;
    performing a two-stage correlation in a time domain based on the sequence of symbols and a reference preamble, the step of performing a two-stage correlation includes:
        performing a one-stage correlation in the time domain based on the sequence of symbols and the reference preamble and obtaining a result of the one-stage correlation, the step of performing a one-stage correlation includes:
            performing a conjugate operation on the reference preamble;
            multiplying two most significant bits of the sequence of symbols received and a conjugate reference preamble in the time domain; and
            performing addition of complex multiplication results;
        delaying the result of the one-stage correlation by a predetermined time period to produce a delayed result;
        performing a conjugate operation on the result of the one-stage correlation to produce a conjugate result; and
        multiplying the delayed result and the conjugate result and obtaining the result of the two-stage correlation; and
    detecting a preamble symbol based on a result of the two-stage correlation.

2. The method of claim 1, wherein the predetermined time period is associated with a period of the reference preamble.

3. The method of claim 1, further comprising performing a complex multiplication with four real multipliers based on two most significant bits of the sequence of symbols received and a conjugate reference preamble in the time domain.

4. The method of claim 1, wherein the step of detecting the preamble symbol comprises:
    comparing a peak value of the result of the two-stage correlation with a preset threshold; and
    directly locating the preamble symbol if the peak value is greater than the preset threshold;

comparing the peak value of the result of the two-stage correlation with a dynamic threshold if the peak value is equal to or less than the preset threshold;

locating the preamble symbol if the peak value is greater than the dynamic threshold.

5. The method of claim 4, wherein the dynamic threshold is determined based on a previous peak value by multiplying the previous peak value with a coefficient.

6. The method of claim 1, wherein the sequence of symbols is repeated periodically.

7. The method of claim 1, wherein the sequence of symbols is received from an Orthogonal Frequency Division Multiple Access wireless communication system based on IEEE 802.16e specification.

8. An apparatus for performing time synchronization, comprising:

a two-stage correlator configured to perform a two-stage correlation in a time domain based on a received sequence of symbols and a reference preamble, the two-stage correlator includes:

a one-stage correlator configured to perform a one-stage correlation in the time domain based on the sequence of symbols and the reference preamble and obtain a result of the one-stage correlation, the one-stage correlator comprises:

a complex conjugate operator configured to perform a conjugate operation on the reference preamble;

a simplified complex multiplier configured to multiply two most significant bits of the sequence of symbols received and a conjugate reference preamble in the time domain; and a complex accumulator configured to perform additions of complex multiplication results;

a delayer configured to delay the result of the one-stage correlation by a predetermined time period to produce a delayed result;

a complex conjugate operator configured to perform a conjugate operation on the result of the one-stage correlation to produce a conjugate result; and a multiplier configured to multiply the delayed result and the conjugate result and obtain the result of the two-stage correlation; and a detector coupled to the two-stage correlator, the detector configured to detect a preamble symbol based on a result of the two-stage correlation.

9. The apparatus of claim 8, wherein the predetermined time period is associated with a period of the reference preamble.

10. The apparatus of claim 8, wherein the detector comprises:

a first comparator configured to compare a peak value of the result of the two-stage correlation with a preset threshold;

a second comparator coupled to the first comparator, the second comparator configured to compare the peak value of the result of the two-stage correlator with a dynamic threshold if the peak value is equal to or less than the preset threshold; and a dynamic threshold generator coupled to the second comparator, the dynamic threshold generator configured to generate the dynamic threshold based on a previous peak value.

11. The apparatus of claim 10, wherein the dynamic threshold generator comprises:

a peak preserver configured to save the previous peak value; and a coefficient controller coupled to the peak preserver, the coefficient controller configured to determine a magnitude of the dynamic threshold by multiplying the previous peak value with a coefficient.

12. The apparatus of claim 8, wherein the sequence of symbols is repeated periodically.

13. The apparatus of claim 8, wherein the sequence of symbols is received from an Orthogonal Frequency Division Multiple Access wireless communication system based on IEEE 802.16e specification.

14. A receiver, comprising:

an apparatus configured to perform time synchronization including:

a two-stage correlator configured to perform a two-stage correlation in a time domain based on a received sequence of symbols and a reference preamble, the two-stage correlator comprises:

a one-stage correlator configured to perform a one-stage correlation in the time domain based on the sequence of symbols and the reference preamble and obtain a result of the one-stage correlation, the one-stage correlator comprises:

a complex conjugate operator configured to perform a conjugate operation on the reference preamble;

a simplified complex multiplier configured to multiply two most significant bits of the sequence of symbols received and a conjugate reference preamble in the time domain; and a complex accumulator configured to perform additions of complex multiplication results;

a delayer configured to delay the result of the one-stage correlation by a predetermined time period to produce a delayed result;

a complex conjugate operator configured to perform a conjugate operation on the result of the one-stage correlation to produce a conjugate result; and a multiplier configured to multiply the delayed result and the conjugate result and obtain the result of the two-stage correlation; and a detector coupled to the two-stage correlator, the detector configured to detect a preamble symbol based on a result of the two-stage correlation; and an apparatus configured to perform frequency synchronization, coupled to the apparatus configured to perform time synchronization, and configured to estimate and compensate a carrier frequency offset of the sequence of symbols received.

15. The receiver of claim 14, wherein the predetermined time period is associated with a period of the reference preamble.

16. The receiver of claim 14, wherein the detector comprises:

a first comparator configured to compare a peak value of the result of the two-stage correlation with a preset threshold;

a second comparator coupled to the first comparator, the second comparator configured to compare the peak value of the result of the two-stage correlation with a dynamic threshold if the peak value is equal to or less than the preset threshold; and a dynamic threshold generator coupled to the second comparator, the dynamic threshold generator configured to generate the dynamic threshold based on a previous peak value.

17. The receiver of claim 16, wherein the dynamic threshold generator comprises:

a peak preserver configured to save the previous peak value; and a coefficient controller coupled to the peak preserver, the coefficient controller configured and programmed to determine a magnitude of the dynamic threshold by multiplying the previous peak value with a coefficient.

18. The receiver of claim 14, wherein the sequence of symbols is repeated periodically.

19. The receiver of claim 14, wherein the sequence of symbols is received from an Orthogonal Frequency Division Multiple Access wireless communication system based on IEEE 802.16e specification.

* * * * *